May 15, 1956   S. GILMAN ET AL   2,745,411
CONTROL FOR CIGARETTE MAKING MACHINE
Filed Oct. 2, 1950   3 Sheets-Sheet 1
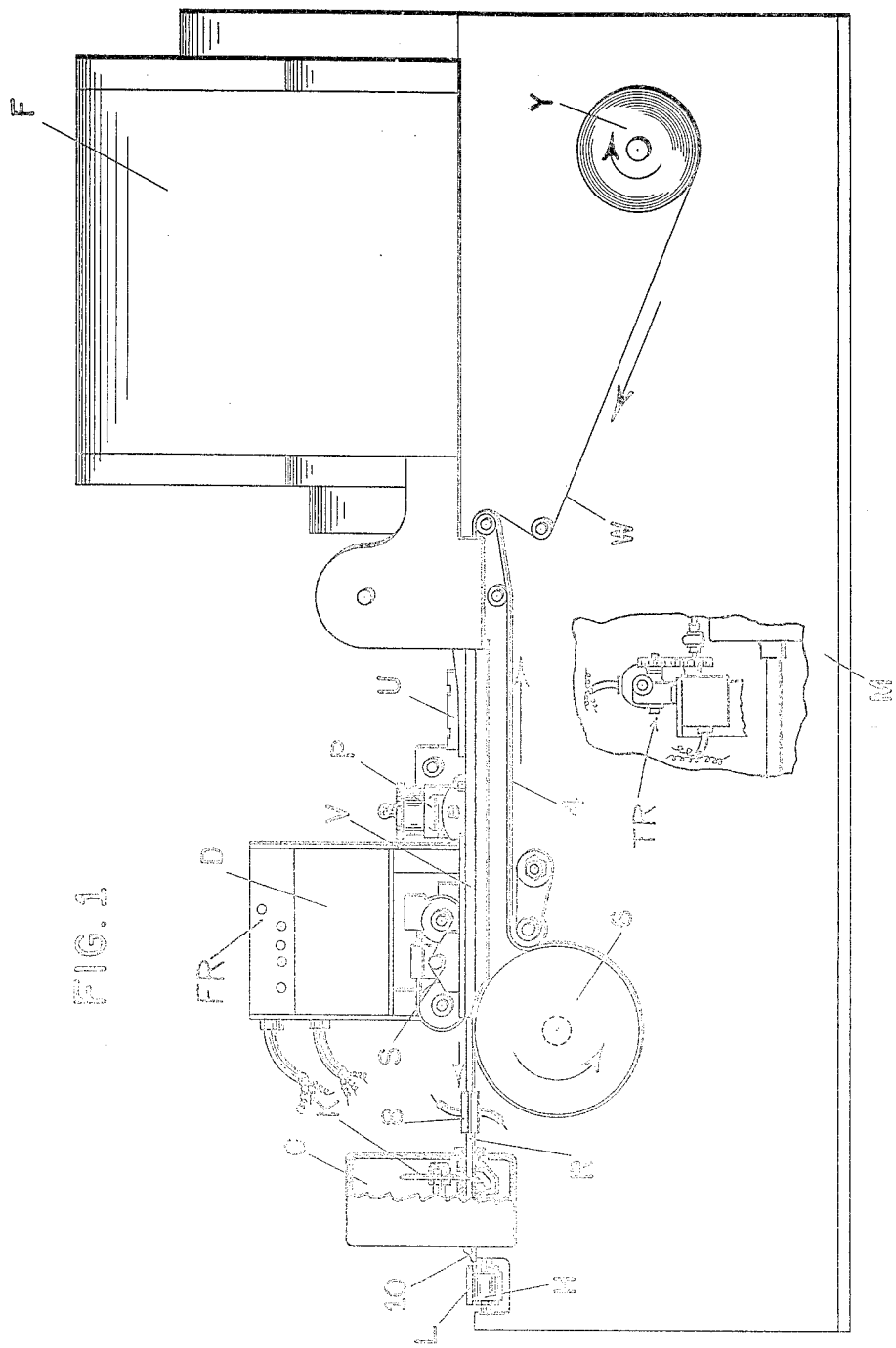
INVENTORS
SAMUEL GILMAN
VINCENT J. PETRUCELLY
BY
ATTORNEY

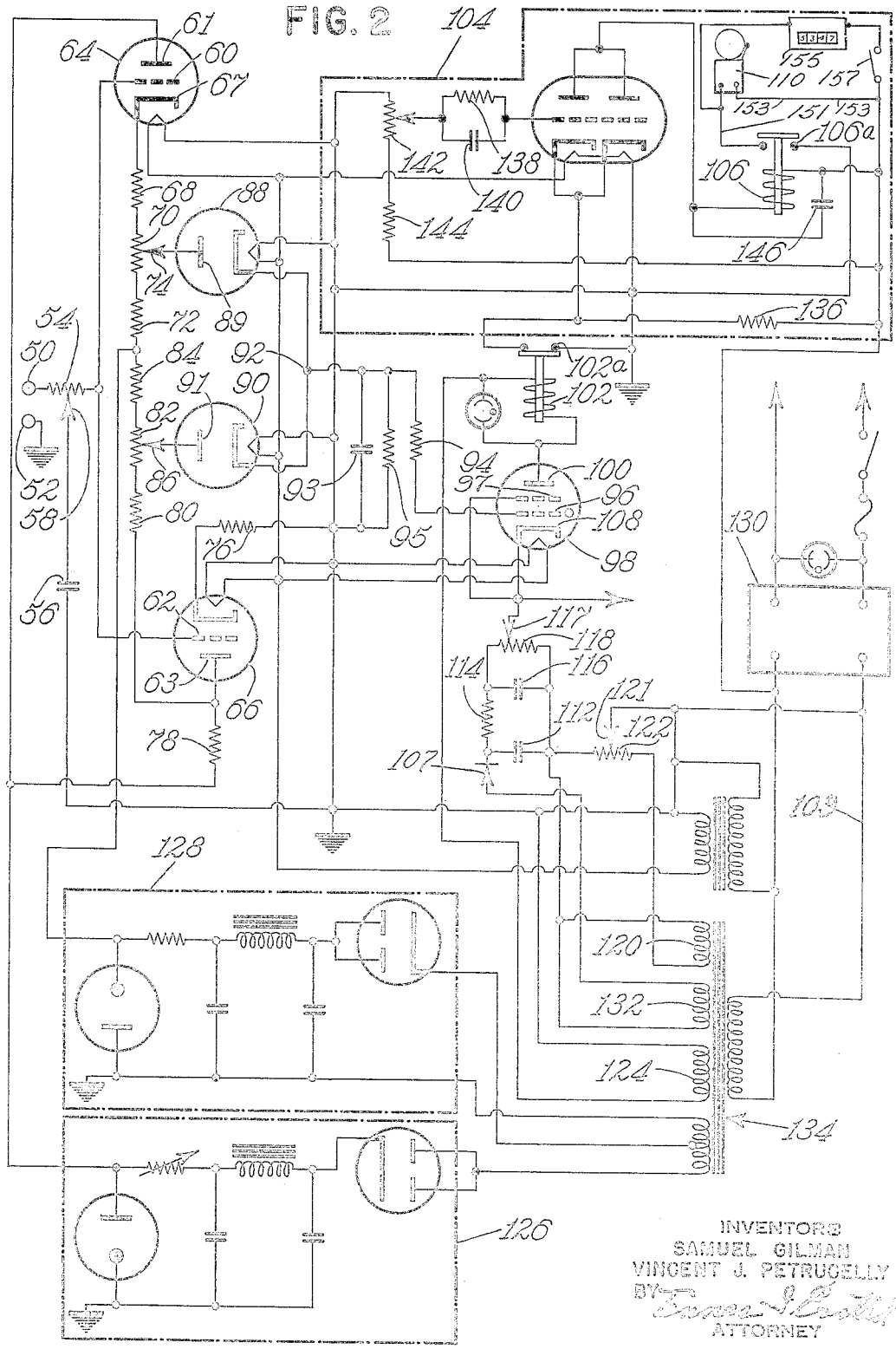

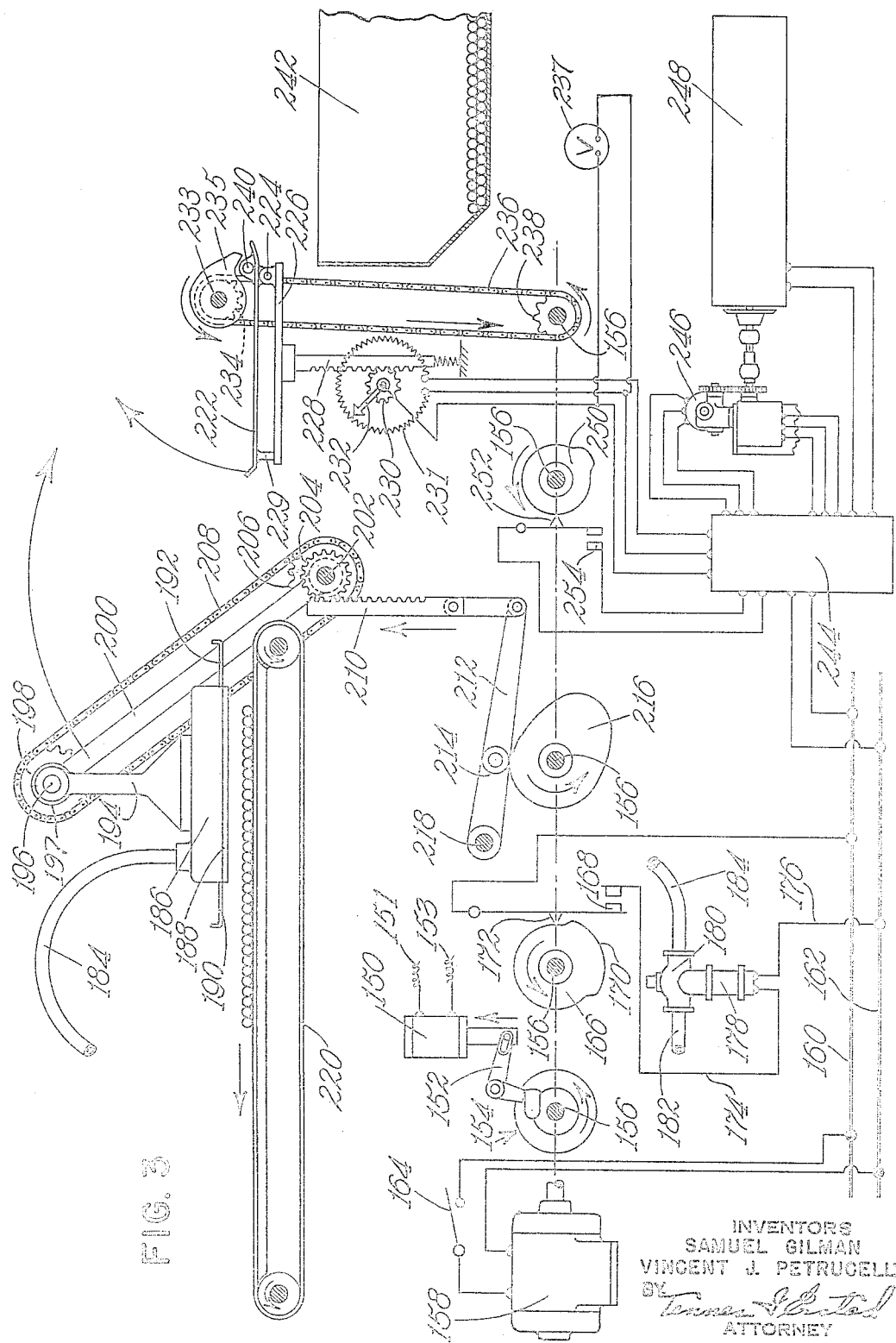

United States Patent Office 2,745,411
Patented May 15, 1956

2,745,411

CONTROL FOR CIGARETTE MAKING MACHINE

Samuel Gilman, Maplewood, N. J., and Vincent J. Petrucelly, New York, N. Y., assignors to American Machine and Foundry Company, a corporation of New Jersey Application October 2, 1950, Serial No. 188,034

13 Claims. (Cl. 131—22)

This invention relates to a method and apparatus for monitoring the operation of a control device and more particularly to an automatic indicator or control which operates whenever a varying electrical quantity or a varying quantity which can be converted to an electrical quantity is maintained within certain preset limits for a predetermined length of time.

Heretofore, in order to determine whether cigarettes of the correct weight are being made by a cigarette making machine, it has been the practice to manually or automatically remove sample cigarettes for weighing at random or predetermined intervals. In cases where an automatic detecting device is employed for controlling the rate of feed of a cigarette making machine, this practice had the disadvantage that there was a lack of correlation between the cigarettes selected for weighing and the functioning of the electrical equipment. For example when cigarettes are removed at random or predetermined intervals for weighing, it is not known whether the detecting device ascertained the weight of these cigarettes correctly. Consequently although a physical weight of cigarettes is obtained, this does not determined whether the detecting equipment is operating properly or not because the weighed cigarettes, even if overweight or underweight, might agree with the indications of the detecting equipment.

The present invention is particularly well suited for use with an apparatus such as that described in copending applications of Broekhuysen and Petrucelly, S. N. 148,662, filed March 9, 1950, as well as Broekhuysen and Gilman, S. N. 148,661 filed March 9, 1950. In such an apparatus the present invention may be used to indicate that cigarettes being manufactured are of the desired weight for which the control is set. This indication is given after a predetermined number of cigarettes have been produced by the machine which it detects as being of the desired average weight. At the end of this period, a bell rings or a device is actuated so that these cigarettes may be collected and weighed. The weight of these selected cigarettes is then checked by weighing to ascertain whether the machine is actually making cigarettes of the weight for which it is set. As a result of this checking any corrections that have to be made in the feed regulating equipment as shown and described in the aforementioned copending applications are then made either automatically or manually.

It is therefore an object of this invention to overcome the disadvantages of the prior art by providing a circuit which becomes responsive when the weight of cigarettes measured by the detector is of the desired average weight for a predetermined length of time.

Another object of this invention is to provide an indication of this correct average weight during the predetermined length of time by ringing a bell or flashing a light so that the operator will know which cigarettes to remove for weighing.

A further object of this invention is to permit the introduction of a correction into the detector based on the weight of the cigarettes selected by the selecting apparatus.

A further object is to provide cigarette manufacturers with means for physically checking the electrical operation of an automatic detector against a factory weighing standard.

A further object is to provide correcting apparatus for correcting the detector by making possible the automatic selection of a sample of cigarettes of desired weight or other quality and removing and weighing the sample automatically and then making whatever correction to the detector that is necessary to obtain accurate detection.

Another object is to provide an electrical type of "go, no-go" gauge for allowing material being manufactured to be removed for purposes of inspection to determined either manually or automatically if certain automatic controls are operating properly on material being manufactured continuously as well as on non-continuous manufacture.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

Fig. 1 is a side elevation of the cigarette making machine showing applicants' control associated therewith;

Fig. 2 is an electrical circuit showing the applicants' method of selection of cigarettes for checking the operation of the feed control;

Fig. 3 is a schematic illustration of one type of automatic device for correcting the detecting apparatus.

In general this invention is a device which may be used for indicating automatically when any quantity that may be converted electrically is held at some value and/or values for a period or periods of time. Such a device is useful in any application requiring automatic indication when a quantity varies within certain limits and within certain periods of time. For example, the present invention may be used for indicating when the speed of a rotating member is held at the same speed or speeds for a period or periods of time or for indicating when a line voltage is held at some voltage of frequency for a predetermined period of time. This invention is particularly well adapted for use with a cigarette making machine having an electrical control such as that disclosed in copending applications, of Broekhuysen and Petrucelly, and Broekhuysen and Gilman, referred to hereinbefore.

With reference to Fig. 1 the continuous rod cigarette machine consists of a tobacco feed F and a cigarette maker M. The principal components of the cigarette maker M consists of a rod folder tongue U, a rod former V, a cigarette rod paster P, a rod sealer S, a detector 8, a detector control box D, a feed regulator TR, a feed regulator control FR, a cut-off device C and a cigarette catcher or collector H.

In operation, the tobacco feed F showers tobacco in a manner well known to the art continuously onto a traveling tape (not shown) which in turn delivers the tobacco ribbon onto a traveling paper web W. The latter is fed from a reel Y and is guided through the rod folder tongue U, the rod paster P which applies a line of paste to the lap edge of the cigarette rod, the rod former V and the rod sealer S, by means of a continuously moving folding belt 4 driven by a drum 6. The continuous cigarette rod R, emerging from the rod former plates V, passes past a suitable detector 8 into the cut-off mechanism C where a knife K cuts off individual cigarettes L which are then pushed through a guide tube 10 onto a continuously driven collector belt of the catcher or collector mechanism H. The detector 8 may be of the dielectric type described in the patent applications mentioned above. Feed regulator TR, which regulates the amount of tobacco being fed to traveling paper web W, is controlled by feed regulator FR, which is actuated in response to a signal received from detector 8. The feed regulator TR and control FR may be of the type described in the aforementioned Broekhuysen and Gilman application Serial No. 148,661.

Referring to the electrical circuit shown in Fig. 2, the electrical signal received from a suitable detector such as described in the co-pending application S. N. 148,662 of Broekhuysen and Petrucelly referred to above, is impressed across terminals 50 and 52. This signal passes through an integrating circuit consisting of potentiometer 54 and capacitor 56. The amount of integration or averaging effect is variable by means of the slider 58 of potentiometer 54. The integrated signal then passes to the grids 60 and 62 of vacuum tubes 64 and 66. Vacuum tube 64 is a cathode follower and vacuum tube 66 is a phase inverter.

After the integrated signal passes through the vacuum tubes 64 and 66 it appears at the sliding tap 74 of potentiometer 70 and sliding tap 86 of potentiometer 82. The signal then passes through either diode 88 or 90 depending upon its polarity as described hereinafter. The signal will then appear at the common junction 92 of the cathodes of diodes 88 and 90, and hence at the grid 96 of thyratron 98. If the signal is of the proper voltage, thyratron 98 will extinguish thereby releasing relay 102 and allowing the normally closed contacts 102a to close.

This permits the starting of the timing cycle of the timing circuit enclosed in box 104. This timing circuit is a conventional circuit which permits adjustment of the timing period to suit the desired conditions. At the end of the timing cycle the relay 106 pulls in closing normally open contacts 106a thereby impressing a voltage from the power supply 109 across the bell 110.

When the signal deviates from the average value by more than a predetermined amount it is sufficiently positive to fire thyratron 98. This energizes relay 102 and maintains the normally closed contacts 102a in the open position, thus preventing the start of the timing cycle.

The ringing of the bell 110 indicates to the operator that the cigarettes produced an electrical signal at terminals 50 and 52 within the proper magnitude and for the required duration for which the equipment was set. These cigarettes if removed from the maker and weighed should correspond in weight to the electrical equivalent as measured by the detector, if the detector is operating properly. Should there be a difference between the setting of the automatic control and the actual weight then a correction is made by the operator to the detector to bring it into agreement with the actual weight. It will thus be seen as the tobacco characteristics change the automatic control provides a ready and accurate means of checking the variations in tobacco characteristics to ascertain whether the detector is operating properly.

The automatic control serves to provide the necessary information for correcting the detector and also to indicate to factory management that there has been a change in condition of the tobacco. This permits the management to more readily ascertain the causes for this change.

It also results in an awareness of change in the condition of the tobacco in a more accurate manner than has heretofore been possible. For example if the selected cigarettes are removed from the catcher and weighed and a difference is found between their weight and the setting of the automatic control, the difference will appear either on the heavy side or on the light side and will indicate whether tobacco is too wet or too dry, and to a certain extent by what amount it is too wet or too dry.

The automatic control circuit consists of the following elements:

Input terminals 50 and 52 feed the signal into an integrating circuit which consists of a potentiometer 54 and a capacitor 56 which in turn feeds the signal into the grids 60 and 62 of cathode follower 64 and phase inverter 66. The cathode 67 of cathode follower 64 is connected to cathode resistor 68, potentiometer 70 and resistor 72. Phase-inverter 66 has cathode resistor 76 and plate resistor 78.

The output of phase inverter 66 is taken from plate 63 and fed to the plate 91 of diode 90 through resistor 80 and the center tap 86 of potentiometer 82. Resistor 84 in combination with potentiometer 82 and resistor 80 permits adjustment of the point at which it is desired to operate on the heavy side of the average cigarette weight.

The signal from the cathode follower is taken off at the slider 74 of potentiometer 70 and is fed to plate 89 of diode 88. The combination of resistor 68, potentiometer 70 and resistor 72 permits adjustment of the point at which it is desired to operate on the light side of the average cigarette weight. Only diode 88 or diode 90 conducts at any one instant. In either case the effect of conduction is evident at the junction 92. Capacitor 93 is chosen to prevent firing of the thyratron 98 due to unwanted or extraneous surges such as might be received from the power line or inductive effect due to operation of electrical components in the vicinity. The common junction 92 of the diodes 88 and 90 is connected to resistor 94 and 95. Resistor 94 is used to limit the amount of grid current through the thyratron 98.

Cathode 103 of thyratron 98 is connected through potentiometer 118 to a D. C. bias consisting of a rectified and filtered alternating voltage obtained from winding 132 of transformer 134. Rectification occurs through rectifier 107 and filtering is accomplished with capacitors 112 and 116 and resistor 114. An A. C. bias from winding 120 is superimposed upon the D. C. bias through potentiometer 122. The A. C. bias is polarized so that the grid 97 is of opposite polarity to the A. C. voltage from winding 124 which is applied to the plate 100 of thyratron 98 through relay 102.

Positive voltage is applied to the plates 61 and 63 of vacuum tubes 64 and 66 from a conventional power supply enclosed in box 126.

Negative voltage from a conventional power supply enclosed in box 128 is supplied to the cathode follower 64 and to the resistor net work 80, 82 and 84. The input voltage is fed into a constant voltage transformer 130 to provide a regulated source of voltage which assures stability of operation.

A source of alternating voltage is supplied to the timer enclosed in the boxed-in area 104. This conventional timing circuit consists of a cathode resistor 136, a grid resistor 138 and capacitor 140, a net-work consisting of potentiometer 142 and resistor 144, a relay 106 and capacitor 146 for reducing chattering of the relay and bell 110. A register or counter 155 may also be connected across the terminal wires 151, 153 of bell 110 through switch 157, to enable a record to be kept of the number of times during a given period that the bell 110 rings.

In operation the signal fed into termnals 50 and 52 will in general be varying around an average value. As described in copending application of Broekhuysen and Petrucelly referred to above, a deviation from the average to the light side causes a positive increase in voltage and a deviation to the heavy side from the average, causes a negative increase in voltage.

The operation of this invention may be briefly described as follows:

The biases on thyratron 98 are adjusted by means of slider 117 of potentiometer 118 and slider 121 of potentiometer 122. Slider 74 of potentiometer 70 is used to adjust the point at which the thyratron 98 is extinguished for the light cigarettes and slider 86 of potentiometer 82 is used for adusting the point at which thyratron 98 is extinguished for heavy cigarettes.

Diodes 88 and 90 serve to prevent interaction between the cathode follower circuit consisting of vacuum tube 64 and the phase-inverter circuit of vacuum tube 66. In operation the slider 74 is adjusted so that thyratron 98 remains extinguished as long as the cigarettes are at the desired average weight or deviate on the light side from this average by less than a predetermined amount.

Likewise the slider 86 is adjusted so that the thyratron 98 remains extinguished as long as the cigarettes remain at the desired average weight or deviate on the heavy side from this desired average weight by less than a predetermined amount.

It will thus be seen that thyratron 98 remains extinguished as long as the cigarettes remain at the average weight or deviate from the average weight on the light and heavy sides by less than the predetermined amount which is adjustable to suit the requirements of accuracy and general tobacco conditions. The purpose of the phase-inverter tube 66 is to take the negative signal produced by the heavy cigarettes and change it to a positive signal for tripping the thyratron 98, when the signal deviates from the average by more than the predetermined amount. No inversion is necessary for the signal produced by the light cigarettes since it is already positive. It therefore passes through the cathode follower tube 64, which serves merely as a buffer to prevent any reaction on the detector.

If the signal then holds at the desired average or deviates from this average on the light and heavy sides by less than the preset predetermined amount so that thyratron 98 remains extinguished for a length of time equal to the timing cycle of timer enclosed in area 104, the bell 110 will then ring, and if desired the counter or register 155 will add the occasion of the striking of the bell to those times already counted, provided switch 157 is closed. Should the signal deviate from the average by more than the preset predetermined amount then thyratron 98 will fire and the timing cycle will cease and reset itself so that a full timing cycle will be available as soon as the signal becomes less than the predetermined amount.

If then the signal again returns to less than the predetermined amount the timing cycle will be reinitiated and will act if the desired average holds for the preset length of time. This then insures that no cigarettes are included in the group for weighing that exceed the preset predetermined amount.

If desired, cigarettes may be selected and removed automatically by a suitable automatic mechanism which collects the cigarettes each time their weight holds at the average weight or deviates less than a predetermined amount from this average weight for a predetermined length of time. An example of such an apparatus and circuit is shown in Fig. 3.

The automatic apparatus shown in Figure 3 may be briefly described as follows:

When the weight of the cigarettes being manufactured holds at the average weight or deviates less than a predetermined amount from this average weight for a predetermined length of time the electrical signal which previously was used to actuate the bell 110 is used instead to actuate the solenoid 150 which controls through a bell crank lever 152, the operation of a one revolution clutch 154. The shaft 156 is driven by the one revolution clutch 154 which in turn is driven from a suitable source of power such as the electrical motor 158. Power to the electrical motor comes from the main power lines 160 and 162 when the manually operated switch 164 has been closed. The rotation of shaft 156 causes the cam 166 fixedly mounted thereon to close the switch 168 when the high part 170 of the cam 166 comes in contact with the cam follower 172.

When the switch 168 is closed current flows from the main source of power 160 and 162 through wires 174 and 176 thereby energizing the solenoid 178 which then opens the suction valve 180. The tube 182 is connected to a suitable source of suction (not shown). The flexible tube 184 is connected to a suction transfer head 186 having a foraminous or perforated bottom 188. Suitable slide gates 190 and 192 are provided for adjusting the amount of perforated area that is subject to the action of the suction received through tube 184 when the suction valve 180 is opened.

The suction head 186 is supported on the end of an arm 194. The arm 194 is fixedly mounted on a shaft 196 to which is also fixed a sprocket 198. The shaft 196 is freely mounted in a suitable bearing 197 formed on the upper end of the arm 200. The lower end of the arm 200 is fixed to the shaft 202 to which is also fixed a pinion gear 204 and a sprocket 206, is loosely supported on shaft 202 and is held stationary by suitable means (not shown). The shaft 202 is freely supported in a suitable stationary bearing bracket (not shown). An endless sprocket chain 208 travels around the sprockets 198 and 206. The pinion 204 engages with the toothed rack 210. The rack 210 is moved up and down by an arm 212 having a cam follower 214 mounted on the arm 212. The cam follower 214 rides against the cam 216 which is fixedly mounted on the shaft 156. When the high part of cam 216 engages with the cam follower 214 it causes the arm 212 to pivot on the stationary stud 218 thereby actuating the rack 210.

Cigarettes are continuously moved under and past the suction transfer head 186 on the conveyor belt 220. When the arm 200 is swung in the direction indicated by the arrow it comes to a position where it holds the transfer head 186 over the scale pan 222 so that the cigarettes held by the suction head can be discharged onto the scale pan 222. The scale pan 222 is pivotally mounted on a pivot 224 supported by the platform 226. The other end of the scale pan 222 has a leg 229 which stands on top of a platform 226 to keep the scale pan level. The scale platform 226 is supported on a rack 228 which meshes with the gear 230 to which is secured an electrical slider arm 232 of potentiometer 231. The scale pan 222 is given a tilting motion to discharge the cigarettes thereon by a cam 235 which is fixed to the shaft 233. The shaft 233 is supported in suitable bearing brackets (not shown) and has fixed thereto a sprocket 234. The sprocket 234 is driven by a chain 236 from a sprocket 238 which is fixedly mounted on a shaft 156. When the high part of cam 235 engages with the stud 240 it causes the scale pan to pivot 224 thereby discharging the cigarettes supported thereon into the hopper 242.

When cigarettes are discharged from the suction head 186 onto the scale pan 222, they cause the scale pan to descend. This in turn causes a movement of arm 232 which impresses a voltage on the electronic converter 244, said voltage having a magnitude which is proportional to the weight of the cigarettes on the scale pan 222.

The electronic converter 244 drives reversible motor 246 in a direction which is determined by the movement of contact arm 232 from its previous operating position. This motor 246 adjusts the setting of the dielectric detector 248 which is fully described in copending application of Broekhuysen and Petrucelly referred to above.

An adjustment is made only if the new setting of contact arm 232 is significantly different than what it was in the immediate preceding check. A signal voltage is fed back from the detector 248 through the electronic converter 244 so that when the correction applied to the detector 248 has reached a value sufficient to compensate for the change in weight of the sample cigarettes, the correcting action of motor 246 will cease.

Potentiometer 231, contact arm 232, electronic converter 244, correcting motor 246 and the feed back from detector 248 form a closed servo loop commonly employed and well known in the art for self-correcting devices. Cam 250 is fixedly mounted on shaft 156 and operates cam follower 252 which in turn operates switch 254 so that the servo correcting device is in operation only during the time that a sample of cigarettes is in the scale pan 222 and the scale pan 222 has come to rest. At all other times the position of slider 232 will not affect the setting of detector 248.

A voltmeter 237 is connected to movable arm 232 and one of the fixed resistance terminals of potentiometer 231. As the voltmeter is responsive to the voltage impressed on the electronic converter 244, its scale may be suitably calibrated to provide a visual indication or reading of the actual weight of the cigarettes on the scale pan 222. Thus, if desired, the machine operator may visually check or compare the actual weight as indicated on meter 237 with the apparent weight as indicated by the dielectric detecting apparatus 248. As mentioned heretofore, the operator may then manually adjust the feed regulating equipment or reset the zero level of the dielectric detector rather than utilize the automatic adjusting and resetting apparatus described above.

The operation of the automatic over-riding control shown in Figures 2 and 3 may be briefly described as follows:

The electronic circuit shown in Figure 2 operates in the same manner as previously described herein except that instead of a bell 110 being connected to the wires 151 and 153 carrying the output signal a solenoid 150 is connected to these wires. When cigarettes coming within the predetermined limited for which the detecting apparatus 248 has been set, have been manufactured for the required time by the machine, the solenoid 150 will be energized in the same manner that the bell 110 was energized as previously described. The energization of the solenoid 150 causes the bell crank lever 152 to be actuated so as to operate the one revolution clutch 154 to thereby drive the shaft 156 for one revolution. The one revolution clutch is driven by the motor 158. When the shaft 156 rotates one revolution it also rotates the various cams 166, 216, 250 and sprocket 238 fixedly mounted on this shaft 156. These cams and sprocket cause the various devices shown in Figure 2 to operate in time in the following manner.

When the selected cigarettes arrive at a point where they are directly underneath the suction carrier 186 the high point 170 of cam 166 closes the switch 168 thereby opening the suction valve 180 so as to cause suction in the suction transfer head 186. Shortly before the suction is applied to suction head 186, the rack 210 is actuated by the cam 216 so that the head descends at the proper time onto the cigarettes that have been selected. The suction area of the head 186 may be readily regulated by the setting of the control gates 190 and 192 so that the cigarettes picked up will be those which were selected and in the proper number desired.

The rack 210 is then moved in a reverse direction to thereby swing the supporting bracket 200 to the other side to bring the suction carrier into position over the scale pan 222. It will be noted that the sprocket 206 is stationary and because of this the sprocket chain 208 causes the sprocket 198 to rotate as the arm 200 travels in an arcuate path thereby maintaining the suction carrier 186 always in a horizontal position since the carrier 186 is fixedly secured to the same shaft 196 as the sprocket 198. When the suction carrier 186 is in position over the scale pan 222 the high part 170 of cam 166 moves out of contact with the cam follower 172 thereby causing switch 168 to open thereby releasing the suction by means of valve 180. It will be understood the valve 180 is so designed that when it is closed it allows air from the outside atmosphere to enter the duct 184.

As soon as suction has been cut off from the transfer carrier 186 the cigarettes fall down upon the scale pan 222 which cause it to descend. The configuration of cam 250 is such that the movement of arm 232 caused by the weight of the cigarettes does not become effective until sufficient time has elapsed for the scale platform 226 to come to rest. At the end of this period of time cam 250 operated from shaft 156 causes cam follower 252 to close switch 254 thereby putting the servo correcting mechanism in operation. This results in the detector being corrected so as to make the detection of the dielectric detector synonymous with the actual weight of the cigarettes.

After sufficient time has been allowed for this correction the cam 250 again opens the switch 252 and the high part of cam 235 strikes the lug 240 to tilt the pan 222 to thereby discharge the cigarettes supported thereon into the hopper 242. In the meantime the cam 216 has caused the rack 210 to reverse itself so as to move the suction carrier 186 back to starting position. When these actions have been completed the single revolution of shaft 156 will have been completed. It will thus be seen that I have provided an automatic over-riding control which causes the functioning of a detecting device to be accurately checked upon during its period of operation from samples selected by the detecting device as being within a range of predetermined weights.

It will be understood that there can be many reasons for a detecting device failing to detect accurately the weight of a product it is inspecting. In some cases the composition or quality of the product may change due to a change in moisture content or in the characteristics of the ingredients going into the product. Such a change in the product may cause the reaction of the detector to be modified so that it has to be readjusted to accurately detect under the new conditions. Tobacco products for example have these characteristics and detecting devices have to be regularly adjusted to provide for such changes. It will thus be seen that the present invention has provided a solution for this problem by enabling changes in the characteristics of the tobacco and the failure of a detector to correctly determine weight to be quickly ascertained and corrected.

By keeping a record of how often the over-riding control operates by allowing register 155 to operate for a given period of time also constitutes a means for determining how accurately a machine is operating. Some machines may fail to produce material of the desired quality even though the characteristics of the material does not change. This may be readily ascertained by means of the present invention.

The invention above described may be varied in construction within the scope of the claims for the particular device selected to illustrate the invention is but one of many possible embodiments of the same. The invention, therefore, is not to be restricted to the precise details of the structure shown and described.

What is claimed is:

1. In a cigarette making machine having an automatic feed regulator to increase and decrease the rate of feed so as to feed a constant quantity of tobacco and a detector mounted adjacent to the path of travel of the tobacco stream fed by said machine for determining the quantity of tobacco in said stream, means interconnecting said detector with said feed regulator to control the operation thereof, an indicating device operative only when said detector indicates average weight cigarettes have been manufactured by said cigarette making machine for a predetermined length of time, and a control actuated by said detector for operating said indicating device.

2. In a continuous rod cigarette making machine, a rod former, a dielectric detector for determining the quantity of tobacco in said rod, a tobacco feed for feeding tobacco at a uniform rate to said cigarette rod former, a device for increasing and decreasing the amount of tobacco fed by said tobacco feed, means for interconnecting said dielectric detector with said device to regulate the rate of feed whenever necessary to obtain a predetermined quantity of tobacco in said cigarette rod at all times, and a device actuated by said dielectric detector only when said detector indicates cigarettes have been made for a predetermined length of time which are of the predetermined weight desired to permit the operation of said detector to be checked.

3. In a cigarette making machine having a device for adjusting the rate of feed to make cigarettes of a predetermined weight, a detector for determining the weight of the cigarettes being made, a control for operating said device to cause the correct amount of tobacco to be fed to obtain cigarettes of the weight desired, and a signal device actuated by said detector only when cigarettes of a given weight have been manufactured for a predetemined length of time to permit said cigarettes to be segregated for physically checking the weight thereof against that determined by said detector.

4. In a cigarette making machine, a tobacco feed, a cigarette maker for converting tobacco fed by said feed into a cigarette rod, a feed control for varying the amount of tobacco fed to obtain cigarettes of a predetermined weight, a detecting device for ascertaining the weight of cigarettes as they are being manufactured, means interconnecting said detecting device with said feed control to vary the amount of tobacco fed to obtain cigarettes of the predetermined weight desired, and signal operating means actuated by said detector only when cigarettes of a predetermined weight are indicated by said detecting device to have been made for a predetermined length of time.

5. In a machine for manufacturing products automatically, a device for detecting the weight of the material being produced by said machine, a control device only actuated each time said detector has detected material of a predetermined weight being produced by said machine for a predetermined length of time and apparatus actuated by said control device for effecting a removal of a sample of said material, and an over-riding control effecting a correction in said detector if necessary to correspond with the weight of said sample of said material.

6. A sample selector for an over-riding control comprising, a detecting device for ascertaining the weight of material produced automatically by a machine, a secondary device actuated by said detecting device each time material of a weight coming within predetermined limits has been produced for a predetermined length of time by said machine, means for removing a sample of the material coming within said predetermined limits when said secondary device is actuated, a scale for receiving said sample and weighing the same and means for adjusting said detecting device to conform to the actual weight of the material selected.

7. A sample detector for an over-riding control comprising, a detecting device for ascertaining the weight of material by its electrical characteristics as it is produced automatically by a machine, said material being subject to variations in its electrical characteristics, a secondary device actuated by said detecting device each time material of a weight coming within predetermined limits has been produced for a predetermined length of time by said machine, means for removing a sample of material coming within said predetermined limits each time said secondary device is actuated, apparatus for measuring the actual weight of said sample and means for adjusting said detecting device to conform to the actual weight of the material selected.

8. An over-riding control for use with a detector for detecting the characteristics of the material produced by a machine comprising, a material transferring device operated by said detector each time said detector detects that said machine has produced material having a weight coming within predetermined weight limits, an automatic weighing device to which said material transferring device transfers said material for obtaining the actual weight of the material produced by said machine and means interconnecting said weighing device with said detecting device to effect and adjustment therein whenever the actual weight of the material differs from that ascertained by the detecting device.

9. Control apparatus for an automatic machine comprising, a detecting device for detecting the characteristics of the material produced by said machine, a secondary device actuated by said detecting device each time said detecting has ascertained that said machine has produced for a predetermined length of time material of the weight desired, a third device for determining by an alternative method the physical weight of said material and means interconnecting said third device with said detecting device to effectuate a correction in the latter whenever the weight is different than that detected by said detecting device.

10. The method of monitoring the accuracy of an automatic weight detecting device for detecting continuously during manufacture the weight of a product which comprises the steps of regulating the output of a feeder supplying material to be manufactured into said product in accordance with the apparent weight determined by said automatic weight detecting device, weighing a given quantity of said product on a second weighing device of known accuracy only when said automatic weight detecting device indicates that products of a desired average weight or a deviation therefrom of not more than a predetermined amount are being manufactured, and then comparing the weight indication of said automatic weight detecting device with the actual weight determined by said second weighing device, whereby the accuracy of said automatic device is determined.

11. The method of regulating an automatic feeder for feeding material in a continuous flow which comprises the steps of checking continuously the quantity of material being fed by said feeder, varying the output of said feeder in response to said check to provide a constant quantity of material output therefrom, actuating an indicating device only when said feeder apparently maintains said flow of material substantially at said desired constant quantity for a predetermined length of time, and then removing a selected amount of the material fed only when said indicating device is actuated and comparing the actual weight of said selected amount with a known predetermined normal amount to determine the difference therebetween.

12. The method of monitoring the accuracy of operation of an automatic material control apparatus which comprises actuating an indicating device only when material of a predetermined weight has been made for a predetermined length of time, removing and physically weighing a selected amount of the material only when said indicating device is actuated, comparing the actual weight of said selected amount with a known predetermined normal amount, and then adjusting the control apparatus to conform to the actual physical weight of the material checked.

13. The method of monitoring the operation of a control device which comprises monitoring the weight of material produced by an automatic machine controlled by said control device at a first inspection station, actuating a secondary control only when said first named control device indicates that material produced by said machine for a predetermined length of time comes within the predetermined limits of the weight desired, removing a selected amount of the material to a second inspection station in response to the actuation of said secondary control, weighing said material by a weighing device other than said first-named control device to determine if the selected material is of the actual weight desired and then adjusting said first-named control device if necessary to make the operation of said first-named control device conform to the findings of said second inspection device.

References Cited in the file of this patent

UNITED STATES PATENTS

| | | |
|---|---|---|
| 1,089,680 | Sloan | Mar. 10, 1914 |
| 1,864,728 | Hawkins et al. | June 28, 1932 |
| 1,996,189 | Biro | Apr. 2, 1935 |
| 2,357,860 | Whitaker | Sept. 12, 1944 |

FOREIGN PATENTS

| | | |
|---|---|---|
| 587,210 | Great Britain | Apr. 17, 1947 |
| 775,386 | France | Oct. 8, 1934 |